United States Patent
Van Holen et al.

(10) Patent No.: US 12,305,069 B2
(45) Date of Patent: May 20, 2025

(54) BIOBASED URETHANE (METH)ACRYLATE FOR USE IN CLADDING

(71) Applicant: ALLNEX BELGIUM S.A., Drogenbos (BE)

(72) Inventors: Jurgen Van Holen, Ninove (BE); Guido Vanmeulder, Lot (BE); Michel Tielemans, Wemmel (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 767 days.

(21) Appl. No.: 17/611,757

(22) PCT Filed: Jun. 16, 2020

(86) PCT No.: PCT/EP2020/066544
§ 371 (c)(1),
(2) Date: Nov. 16, 2021

(87) PCT Pub. No.: WO2020/254276
PCT Pub. Date: Dec. 24, 2020

(65) Prior Publication Data
US 2022/0228027 A1  Jul. 21, 2022

(30) Foreign Application Priority Data

Jun. 18, 2019 (EP) .................... 19180779

(51) Int. Cl.
| | |
|---|---|
| *C08F 2/46* | (2006.01) |
| *C08F 2/50* | (2006.01) |
| *C08G 18/67* | (2006.01) |
| *C08G 18/73* | (2006.01) |
| *C08G 61/04* | (2006.01) |
| *C08K 5/17* | (2006.01) |
| *C09D 7/48* | (2018.01) |
| *C09D 7/63* | (2018.01) |
| *C09D 175/14* | (2006.01) |

(52) U.S. Cl.
CPC ....... *C09D 175/14* (2013.01); *C08G 18/6755* (2013.01); *C08G 18/73* (2013.01); *C08K 5/17* (2013.01); *C09D 7/48* (2018.01); *C09D 7/63* (2018.01)

(58) Field of Classification Search
CPC ................ C08G 18/672; C08G 18/792; C08G 18/3206; C08G 18/6755; C08G 18/8175; C08G 18/246; C08G 18/73; C09D 7/63; C09D 7/48; C09D 175/16; C08K 5/17
USPC ....... 522/78, 74, 71, 1; 520/1; 524/198, 186, 524/81, 80, 1
See application file for complete search history.

(56) References Cited

U.S. PATENT DOCUMENTS

2016/0362515 A1  12/2016  Klang et al.
2023/0391942 A1 * 12/2023  Tielemans ........... C08G 18/755

FOREIGN PATENT DOCUMENTS

| EP | 0 760 970 | 10/1995 | |
|---|---|---|---|
| EP | 3 110 868 | 9/2015 | |
| EP | 3 365 383 | 4/2017 | |
| EP | 3365383 A1 * | 8/2018 | ........... C08G 18/672 |
| EP | 3110868 B1 * | 11/2019 | ......... C08G 18/0823 |
| EP | 3365383 B1 * | 12/2020 | ........... C08G 18/672 |
| WO | 2011/098272 | 8/2011 | |
| WO | 2014/064097 | 5/2014 | |

OTHER PUBLICATIONS

Vogel et al, EP 3365383 Machine Translation, Dec. 30, 2020 (Year: 2020).*
International Search Report (ISR) issued Sep. 11, 2020 in International (PCT) Application No. PCT/EP2020/066544.

* cited by examiner

*Primary Examiner* — Jessica Whiteley
(74) *Attorney, Agent, or Firm* — Wenderoth, Lind & Ponack, L.L.P.

(57) ABSTRACT

A radiation curable and at least partially biobased urethane (meth)acrylate for use in a one-component coating composition for cladding an outdoor surface of a building, obtained from the reaction of at least the following compounds: a. a polyisocyanate compound having a biobased carbon content of at least 20%, preferably at least 50%, as determined by method A of the standard ASTM D6866-12:2008, and b. a (meth)acrylate compound, different from compound a, and containing a reactive group capable to react with isocyanate groups.

22 Claims, No Drawings

BIOBASED URETHANE (METH)ACRYLATE FOR USE IN CLADDING

The present invention relates to radiation curable and at least partially biobased urethane (meth)acrylates for use in a coating composition for cladding an outdoor surface of a building, said coating compositions, their preparation, their curing, and their use.

The field of coatings for covering outdoor surfaces is experiencing a revolution. Coatings based on fossil components are increasingly regarded as unacceptable by the public, and the legislators are following suit. At the origin of this trend are an increased awareness of the importance of preserving fossil material reserves and of rethinking the economy in renewable terms. Nowhere in the coating industry is this tendency more prevalent than in the field of outdoor applications where direct contact between the coating and nature further increases the perceived need for the use of greener products.

In parallel, coatings for covering outdoor surfaces must satisfy demanding specifications in term of mechanical and weathering resistance, specifications which are not traditionally associated with green materials.

Recently, the chemical industry has made some efforts to develop greener polymeric products but none of them manage to satisfy the demanding specifications of coatings for outdoor uses.

WO 2014/064097 A1 discloses a binding agent, partially based on biobased components, for use in the chemical fixing engineering field.

WO 2011/098272 A2 discloses a polyurethane dispersion, partially based on biobased components, for use in coatings, adhesives, sealants, elastomers, and flexible or rigid foams.

However, the type of compositions exemplified in the patent applications above comprise ether bounds that are not suitable for providing the UV stability required for outdoor use.

EP0760970 describes radiation curable resins, partially based on biobased components, to reduce migration between layers in multicolor proofing systems. Such a resin is however not likely to display sufficient hardness for being useful as a coating for covering an outdoor surface.

There remains therefore a need in the art for at least partially biobased coating compositions having properties, and in particular mechanical and weathering resistance, suitable for covering outdoor surfaces.

It is hence an object of the present invention to develop radiation curable and at least partially biobased urethane (meth)acrylates that overcome at least partially some of the above drawbacks.

In a first aspect, the present invention relates to a radiation curable and at least partially biobased urethane (meth) acrylate for use in a coating composition for cladding an outdoor surface of a building, obtained from the reaction of at least the following compounds:
a. A polyisocyanate compound having a biobased carbon content of at least 20%, preferably at least 50% as determined by method A of the standard ASTM D6866-12: 2008, and
b. A (meth)acrylate compound, different from compound a, and containing a reactive group capable to react with isocyanate groups.

In a second aspect, the present invention relates to a coating composition for cladding an outdoor surface of a building comprising the urethane (meth)acrylate according to any embodiments of the first aspect.

In a third aspect, the present invention relates to a process for preparing a radiation curable and at least partially biobased urethane (meth)acrylate for use in a coating composition for cladding an outdoor surface of a building, comprising the step of reacting together at least the following compounds:
a. A polyisocyanate having a biobased carbon content of at least 50% as determined by method A of the standard ASTM D6866-12: 2008, and
b. A (meth)acrylate compound, different from compound a, and containing a reactive group capable to react with isocyanate groups.

In a fourth aspect, the present invention relates to a process for curing an urethane (meth)acrylate according to any embodiment of the first aspect or a coating composition according to any embodiment of the second aspect comprising exposing the urethane (meth)acrylate or the composition to one or more of the following: electron beam or UV radiation.

In a fifth aspect, the present invention relates to the use of a urethane (meth)acrylate according to any embodiment of the first aspect or of a coating composition according to any embodiment of the second aspect, for covering an outdoor surface.

In a sixth aspect, the present invention relates to a substrate coated with a urethane (meth)acrylate according to any embodiment of the first aspect or a composition according to any embodiment of the second aspect.

By "urethane (meth)acrylate" is here meant a compound containing at least one (usually several) urethane functions and at least one (usually several) (meth)acrylate functions.

Preferably, the "urethane (meth)acrylate" having several (meth)acrylate functions are derived from esterification products of aliphatic or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones and lactides which add to these polyols in a ring-opening reaction. These modified or unmodified polyols are partly esterified with acrylic acid, methacrylic acid or mixtures thereof until the desired residual hydroxyl functionality is reached. Alternatively these products can be obtained by transesterification of the polyols with (meth)acrylic esters. It is known to the person skilled in the art that the (trans)esterification of polyols typically brings a mixture of (meth)acrylated components that can advantageously be characterized by the hydroxyl number (IOH) expressed in mgKOH/g. These polyacrylated compounds typically have an hydroxyl number (IOH) in the range of from 15 to 300 mg KOH/g. Preferred molecules in this category are glycerol diacrylate, trimethylolpropane diacrylate, pentaerythritol triacrylate, ditrimethylolpropane triacrylate or dipentaerythritol pentaacrylate. Preferably, the esterification products, such as the polyols or the (meth)acrylic acid can be biobased.

The urethane (meth)acrylate according to the first aspect of the present invention is radiation curable. This is due to the presence of the (meth)acrylate functions. Suitable radiation types for the curing of the urethane (meth)acrylate according to the first aspect are UV light and electron beam. Suitable UV light wavelengths are comprised between 200 and 400 nm.

Typical suitable UV light sources emit light at wavelengths between 200 and 800 nm and emit at least some radiation in the range 200 to 400 nm.

The source of the UV light can for instance be a UV light emitting diode (UV-LED). UV-LED typically emit in a spectrum with the strongest wavelength in the range of from 365 to 395 nm.

The source of radiation can be an Excimer lamp such as one from IOT GmbH at 172 nm.

Another example of suitable source of UV light is a medium pressure Hg bulb.

Preferably, the urethane (meth)acrylate is for use in a one-component coating composition. According to this invention, a one-component coating composition is a composition that is curable without the addition of other compounds. The composition can e.g. be cured by providing UV light or electron beam. The curing of the composition does not require the addition of other components that needs to be added separately in order to provide curing of the coating. This is in contrast with a two-component.

The urethane (meth)acrylate according to the first aspect is at least partially biobased because it is obtained from a polyisocyanate compound having a biobased carbon content of at least 20%, preferably at least 50%. Furthermore, in embodiments, the (meth)acrylate compound may also have a biobased carbon content of at least 20%. The urethane (meth)acrylate may be obtained entirely or partially from biobased compounds Typically, the urethane (meth)acrylate is (only) partially biobased. In particular, the urethane (meth)acrylate is typically obtained from polyisocyanate compound having a biobased carbon content of at least 20%, preferably at least 50%, and from a (meth)acrylate compound which has a biobased carbon content of 0%.

The biobased carbon content is determined by method A of the standard ASTM D6866-12: 2008. This method makes use of the carbon 14 method operated on a sample of the urethane (meth)acrylate. Since the ratio of carbon isotopes can still be determined after the production process, a distinction between fossil and biobased carbon is possible. Bio-based products may consist entirely or partially of bio-based raw materials.

The fact that the urethane (meth)acrylate according to the first aspect is at least partially biobased is advantageous because:

It reduces the use of fossil components (for example derived from oil, lignite, or coal), which reserves are limited and which contribute, at the end of the urethane (meth)acrylate life cycle, to the carbon dioxide content of the atmosphere, and The at least partially biobased isocyanate compound(s) entering its composition can be produced in two steps through fermentation of starch or maize and biorefinery while the fossil isocyanates must be obtained from a four step petrol based synthesis.

The urethane (meth)acrylate of the first aspect is for use in a coating composition for covering an outdoor surface, and more particularly for cladding an outdoor surface of a building. Outdoor surfaces are exposed to weathering and in particular to solar radiation, heat, cold, rain, and mechanical shocks. The urethane (meth)acrylate of the first aspect is suitable for protecting outdoor surfaces from weathering over an extended period.

Typical outdoor surfaces that can be covered by the urethane (meth)acrylate of the first aspect are the exterior surfaces of buildings. The urethane (meth)acrylate of the first aspect is particularly suitable for use as a siding, facing or cladding.

The terms "siding", "facing", and "cladding" are interchangeable and relate to a material applied to the outside of a building to make it weatherproof. It is a protective material attached to the exterior side of a wall of a house or other building. Along with the roof, it forms the first line of defense against the elements, most importantly sun, rain/snow, heat and cold, thus creating a stable, more comfortable environment on the interior side. The siding material and style also can enhance or detract from the building's beauty. There is a wide and expanding variety of materials to side with, both natural and artificial, each with its own benefits and drawbacks. Masonry walls as such do not require siding, but any wall can be sided. Walls that are internally framed, whether with wood, or steel I-beams, however, must always be sided.

The polyisocyanate compound a is not necessarily a pure compound. It can be a mixture of different polyisocyanate molecules, especially in the case of oligomers and polymers.

The polyisocyanate compound a comprises an average of at least 2, preferably from 2 to 5, more preferably from 3 to 5, yet more preferably from 3.5 to 4.5 isocyanate groups per molecule. For instance, in the case of a polyisocyanate compound a consisting of pentane diisocyanate, the average number of isocyanate groups is 2. The polyisocyanate compound a may be a polymer, an oligomer or a monomer molecule of polyisocyanate. Preferably, the polyisocyanate compound a is an oligomer of a diisocyanate. The oligomer may comprise an allophanate (R—NH—CO—NR—CO—O—R), a biuret (R—NH—CO—NR—CO—N—R), or an isocyanurate group of the following formula:

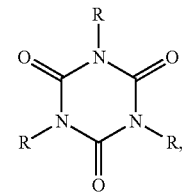

wherein R is an aliphatic chain comprising an isocyanate group, usually in terminal position. The aliphatic chain preferably has from 2 to 8, more preferably from 2 to 6 carbon atoms.

Preferably, the oligomer comprises a trimer. More preferably, the oligomer comprises more than 50 mol % of trimers.

The polyisocyanate compound a is preferably aliphatic. Most preferably, the polyisocyanate compound a comprises a monomer or an oligomer of a $C_2$-$C_8$, preferably $C_5$-$C_6$ aliphatic diisocyanate, more preferably $C_5$. Chains of 8 or less carbons are advantageous as they lead to resins with sufficient hardness and strength for use on outdoor surfaces.

Preferably, the polyisocyanate compound a has an isocyanate content of at least 15 wt %.

Preferably, the polyisocyanate compound a has an isocyanate content of at most 75 wt %.

In a particularly preferred embodiment, the polyisocyanate compound a comprises an isocyanurate trimer of pentamethylene diisocyanate. Most preferably, the polyisocyanate compound a is an oligomer of pentamethylene diisocyanate comprising a trimer, wherein the polyisocyanate compound a has an average of from 3 to 5 or 3.5 to 4.5 isocyanate groups per molecule. This compound is commercially available under the name Desmodur® eco N 7300 from Covestro Deutschland AG.

Examples of polyisocyanate compounds a suitable for use in the first aspect comprise penta- or hexamethylene diisocyanate-based monomeric, oligomeric or polymeric isocyanates. Oligomers of pentamethylene diisocyanate are commercially available under the name Desmodur® eco N 7300 from Covestro Deutschland AG as mentioned above or under the name Tolonate™ X FLO 100 from Vencorex Chemicals or Vencorex Holding. Monomeric 1,5-pentamethylene diisocyanate is commercially available under the name STABiO™ from Mitsui Chemicals.

A mixture of polyisocyanate compounds may be used as long as at least one of them is a polyisocyanate compound a as defined herein. In that case, the mixture of polyisocyanate compounds preferably has a biobased carbon content of at least 20%, preferably at least 50%, as determined by method A of the standard ASTM D6866-12: 2008. Also, in the case of a mixture of polyisocyanate compounds, preferably at least 50 wt % thereof consists in a biobased polyisocyanate compound a as defined herein.

The (meth)acrylate compound b, different from the polyisocyanate compound a contains a reactive group capable to react with isocyanate groups. Either a single (meth)acrylate compound b or a plurality thereof can be used. The reactive group capable to react with isocyanate groups can for instance be a hydroxyl group or an amino group. This reactive group is preferably a hydroxyl group.

Preferably, the (meth)acrylate compound b has one or more hydroxy groups in the molecule, and one or more (meth)acryloyl groups in the molecule.

Preferably, the (meth)acrylate compound b has an alkyl chain having from 2 to 4 carbon atoms.

Preferably, the (meth)acrylate compound b has from 1 to 3 groups capable to react with isocyanates, preferably from 1 to 3 hydroxyl groups.

The (meth)acrylate compound b can be cyclic or acyclic.

Acrylate compounds, including for example acrylate compounds (b), are often preferred over methacrylate compounds because of their higher reactivity.

Examples of acyclic compounds b are 2-hydroxyethyl (meth)acrylate, 2-hydroxyethyl propyl (meth)acrylate, 4-hydroxybutyl (meth)acrylate, pentaerythritol tri (meth)acrylate, dipentaerythritol penta (meth)acrylate, amongst others.

An example of a cyclic compound b is cyclohexanedimethanol (meth)acrylate.

Also usable are epoxy (meth)acrylates obtained from the reaction of (meth)acrylic acid with epoxides, i.e. compounds comprising at least one epoxide function. The epoxide compound can be a monoepoxide such as for example a glycidyl ester. The epoxide compound can be a polyepoxide compound. These polyepoxides are generally chosen from glycidyl ethers of aromatic or aliphatic alcohols, polyols and from cycloaliphatic polyepoxides. Preferred epoxides are diglycidylethers of aromatic, aliphatic and/or cycloaliphatic diols, such as diglycidyl ether of bisphenol-A, diglycidyl ether of bisphenol-F, diglycidylether of poly(ethylene oxide-co-propylene oxide), diglycidylether of polypropylene oxide, diglycidylether of hexanediol, diglycidylether of pentanediol, diglycidylether of butanediol. For instance, the reaction product of (meth)acrylic acid with the diglycidyl ether of bisphenol-A can be used as compound b, or Ebecryl® 113 from allnex, which is a monofunctional acrylated aliphatic epoxy product.

Examples of commercially available compounds b are "HEA" also called "BHEA" (2-hydroxyethyl acrylate, manufactured by Nippon Shokubai Co., Ltd.), "CHDMA" (cyclohexanedimethanol methanol monoacrylate, manufactured by Nippon Kasei Chemical Co., Ltd.), "PETIA" (a mixture of pentaerythritol triacrylate and pentaerythritol tetraacrylate manufactured by allnex) and the like.

In some embodiments, the urethane (meth)acrylate of the first aspect is obtained from, only, one or more polyisocyanate compounds a and one or more (meth)acrylate compounds b. In these embodiments, no other monomers than the one or more polyisocyanate compounds a and one or more (meth)acrylate compounds b enter the composition of the urethane (meth)acrylate.

In other embodiments, the urethane (meth)acrylate of the first aspect can be obtained from, at least, one or more polyisocyanate compound a and one or more (meth)acrylate compound b. In these embodiments, other compounds can participate in the formation of the urethane (meth)acrylate. For instance, one or more polyisocyanate compounds, other than the one or more polyisocyanate compounds a, can be used to obtain the urethane (meth)acrylate.

In the first aspect of the present invention, the radiation curable and at least partially biobased urethane (meth)acrylate for use in a coating composition for cladding an outdoor surface of a building is obtained from the reaction of at least the following compounds: a polyisocyanate compound a as defined herein, and a (meth)acrylate compound as defined herein. In some embodiments, said following compounds further comprise a polyol c different from compounds a and b. In these other embodiments, one or more polyols c, other than the (meth)acrylate compounds b and the polyisocyanate compound a, can be used to obtain the urethane (meth)acrylate. When one or more polyols c are used, their hydroxyl groups represent preferably at most 30 mol % of the reactive groups capable to react with isocyanate groups in the ensemble of the (meth)acrylate compounds b and the one or more polyols c.

The polyols c are compounds having two or more hydroxyl groups in the molecule and not having a (meth)acrylate group. Preferably, the polyols c have from two to four hydroxyl groups in the molecule.

Polyols c may comprise acyclic polyols such as ethylene glycol, propylene glycol, trimethylene glycol, tetramethylene glycol, 2-ethyl-1,3-hexanediol, 1,3-butanediol, 1,4-butanediol, 1,6-hexanediol, neopentyl glycol, diethylene glycol, triethylene glycol, dipropylene glycol, polyoxy C 2-4 alkylene glycol (polyethylene glycol, polypropylene glycol, polyoxytetramethylene glycol, etc.), polyester diols, polyether diols, diols and polycarbonate diols; glycerol, 1,1,1-tris (hydroxymethyl) propane, D-sorbitol, xylitol, D-mannitol, D-mannitol, diglycerin, polyglycerin, trimethylol ethane, trimethylol propane, pentaerythritol, polyether polyols, polyester polyols, polycarbonate polyol, acrylic polyol, epoxy polyol, natural oil polyol, silicone polyol, fluorine polyol, hexylene glycol, polyester diols, polyether diols, polycarbonate diols, a polyol having three or more hydroxy groups in a molecule such as polyolefin polyols, and alcohols obtained from these acyclic alcohols by alkoxylation. Preferably, the acyclic polyols may be selected from ethylene glycol, propylene glycol, trimethylene glycol, tetramethylene glycol, 1,3-butanediol, 1,4-butanediol, 1,6-hexanediol, neopentyl glycol, diethylene glycol, triethylene glycol, dipropylene glycol, polyoxy $C_{2-4}$ alkylene glycol (polyethylene glycol, polypropylene glycol, polyoxytetramethylene glycol, etc.), polyester diols, polyether diols, diols and polycarbonate diols; glycerol, 1,1,1-tris (hydroxymethyl) propane, diglycerin, polyglycerin, trimethylol ethane, trimethylol propane, pentaerythritol, polyether polyols, polyester polyols, polycarbonate polyol, acrylic polyol, epoxy polyol, natural oil polyol, silicone polyol, fluorine polyol, hexylene glycol, polyester diols, polyether diols, polycarbonate diols, a polyol having three or more hydroxy groups in a molecule such as polyolefin polyols, and alcohols obtained from these acyclic alcohols by alkoxylation.

Polyols c may comprise cyclic polyols such as bisphenol A, bisphenol F, hydrogenated bisphenol A, hydrogenated bisphenol F, cyclohexanediol, cyclohexanedimethanol, tricyclodecanedimethanol, polyester polyols having an alicyclic skeleton, polyolefin polyols having an alicyclic skeleton, polyacrylic polyols having an alicyclic skeleton, polycarbonate polyol having an alicyclic skeleton, etc.) or and alcohols obtained from these cyclic alcohols by alkoxylation. Polyols c can also be biobased.

Examples of commercially available polyols c are "TCD alcohol DM", a tricyclodecane, manufactured by Okusea Ltd.; "isosorbide" an isosorbide manufactured by Sakae Chemical Co.; PEG-400, a polyethylene glycol having a number average molecular weight of 400 manufactured by Sanyo Chemical Industries, Ltd., and the like.

In embodiments, said following compounds further comprise a polyamine d different from compounds a, b, and c if present.

Polyamines are organic amino compounds having 2 or more amino groups. Examples of polyamines are hydrazine, N, N-dimethylhydrazine, ethylenediamine, 1,3-diaminopropane, tetra- or hexamethylenediamine, diethylenetriamine, phenylenediamine, 2,4- and 2,6-toluenediamine, benzidine, o-chlorobenzidine, 2,5-p-dichlorophenylenediamine, 3,3'-dichloro-4,4'-diamino-diphenylmethane, 4,4'-diaminodiphenylmethane, polyetherdiamines (amino-terminated polyethylene oxides) and polyphenyl/polymethylenepolyamines obtained by condensation of anilines with formaldehyde, Ebecryl® P115 and Ebecryl® P116 copolymerizable amines manufactured by allnex.

Preferably the equivalent ratio of the amount of isocyanate groups (originating from compound a and optionally other isocyanate compounds) to the amount of reactive groups capable to react with isocyanate groups (originating from compound b, c or d) used to form the urethane (meth)acrylate is from 0.9 to 1.1, preferably form 0.95 to 1.05, yet more preferably from 0.99 to 1.01.

Preferably, the urethane (meth)acrylate contains less than 1% and preferably less than 0.1% of unreacted (meth)acrylate compound b.

In a second aspect, the present invention relates to a coating composition for cladding an outdoor surface of a building comprising the urethane (meth)acrylate according to any embodiments of the first aspect. The composition of the second aspect is suitable for protecting outdoor surfaces from weathering over an extended period.

Typical outdoor surfaces that can be covered by the composition of the first aspect are the exterior surfaces of buildings. The composition of the first aspect is particularly suitable for use as a siding, facing or cladding.

In embodiments, the composition may comprise a photoinitiator. The curing of the composition can be performed with or without the use of photoinitiators. Typically, the compositions of the invention comprise at least one photoinitiator. Any photoinitiator or mixtures thereof capable of generating free radicals when exposed to radiation may be used. Preferred photoinitiators include IRGACURE™ 184; acyl phosphine oxides, for example IRGACURE™ 819; benziketals such as IRGACURE™ 651, available from BASF; benzophenones such as ADDITOL® BP available from allnex, IRGACURE™ 1173, and IRGACURE™ BP available from BASF or Speedcure photoiniators from Lambson Ltd.

When present, the amount of photoinitiators in the composition of the second aspect is typically from 0.01 to 10 wt %, preferably from 1 to 8 wt %, more preferably from 3 to 5 wt % relative to the total weight of the composition.

The composition usually comprises inhibitors. Examples of suitable inhibitors include but are not limited to phenolic inhibitors such as hydroquinone (HQ), methyl hydroquinone (THQ), tert-butyl hydroquinone (TBHQ), di-tert-butyl hydroquinone (DTBHQ), hydroquinone monomethyl ether (MEHQ), 2,6-di-tert-butyl-4-methylphenol (BHT) and the like. They may also include phosphines, like triphenylphosphine (TPP) and other materials such as tris-nonylphenylphosphite (TNPP), phenothiazine (PTZ), and triphenyl antimony (TPS). When present, inhibitors are preferably present in an amount up to 0.5 wt %, in particular from 0.0001 to 0.2 wt %, and preferably from 0.01 to 0.1 wt % of the composition.

Photostabilizers can be classified as UV absorbers (UVAs), deactivators (quenchers), hydroperoxide decomposers, and radical scavengers known as hindered amine light stabilizers (HALS).

In embodiments, the composition may further comprise a UV absorber and/or a hindered amine light stabilizer. The UVAs protect the polymers by absorbing destructive UV radiation, while the HALS material protects by reacting with the free radicals that occur after a high-energy UV photon breaks a chemical bond in a polymer.

Examples of UVAs are benzotriazoles such as Tinuvin® 328, Tinuvin® 1130, Tinuvin® 900, Tinuvin® 99-2, and Tinuvin® 384-2, triazines such as Tinuvin® 400, Tinuvin® 405, Tinuvin® 460, Tinuvin® 477, and Tinuvin® 479, and benzophenones such as Tinuvin® 531.

Examples of HALS are Tinuvin® 123, Tinuvin® 144, and Tinuvin® 292, 2,2,6,6-tetramethylpiperidine and 2,6-di-tert-butylpiperidine.

Photostabilizers, when present, may be used in an amount of from 0.1 to 5.0, preferably from 0.5 to 2.5 wt % of the composition.

In embodiments, the composition of the second aspect can further include additional ingredients such as light absorbers such as dyes or pigments, rheology modifiers, wetting agents, plasticizers, non-reactive diluents, and flexibilizers. When present, such additional ingredients may sum up to 50% wt of the composition.

In embodiments, the composition of the second aspect may further include one or more reactive diluents. The reactive diluents are radiation curable unsaturated compounds. They can be used to reduce the viscosity of the composition.

Reactive diluents comprise at least one radiation curable unsaturation such as an allyl group, a vinyl group, or a (meth)acryloyl group. Reactive diluents typically are (meth)acrylated monomers. They are for example selected from mono-, di-, tri- and poly (meth)acrylates. Herein, a poly (meth)acrylate is a compound having more than three reactive (meth)acrylate groups.

Preferably the viscosity of reactive diluents used is in the range of from 5 mPa·s to 2 Pa·s at a temperature of 25° C. and most preferably it is <500 mPa·s.

In embodiments, enough reactive diluents are present in the coating composition to decrease its viscosity below 50 Pa·s, preferably below 40 Pa·s, more preferably below 30 Pa·s. Preferably the reactive diluents used have a number average molecular weight (Mn) in the average range of from 100 to 1000 Daltons, more preferably 200 to 800 Daltons and most preferably 200 to 500 Daltons. Typically, the weight average molecular weight (MW) is at most 1000 Daltons.

An example of suitable (meth)acrylated monomer are alkyl (meth)acrylates represented by a formula $CH_2=C(R^1)COOC_zH_{2z+1}$, wherein $R^1$ is a hydrogen atom or a methyl group, and z is an integer of from 1 to 13, wherein $C_zH_{2z+1}$ may have a straight chain structure or a branched chain structure. Suitable examples of suitable reactive diuluents e include but are not limited to: allyl (meth)acrylate, benzyl (meth)acrylate, butoxyethyl (meth)acrylate, butanediol di(meth)acrylate, butoxytriethylene glycol mono (meth) acrylate, t-butylaminoethyl (meth)acrylate, 3-chloro-2-hydroxypropyl (meth)acrylate, 2-cyanoethyl (meth)acrylate, cyclohexyl (meth)acrylate, 2,3-dibromopropyl (meth)acrylate, dicyclopentenyl (meth)acrylate, N, N-diethylaminoethyl (meth)acrylate, N, N-dimethylaminoethyl (meth)acrylate, 2-ethoxyethyl (meth)acrylate, 2-(2-ethoxyethoxy) ethyl (meth)acrylate, 2-ethylhexyl (meth)acrylate, glycerol (meth) acrylate, glycidyl (meth)acrylate, heptadecafluorodecyl (meth)acrylate, 2-hydroxyethyl (meth)acrylate, 2-hydroxy-3-(meth)acryloyloxypropyltrimethylammonium chloride, 2-hydroxypropyl (meth)acrylate, [gamma]-(meth)acryloxypropyltrimethoxysilane, 2-methoxyethyl (meth)acrylate, methoxydiethylene glycol (meth)acrylate, methoxytriethylene glycol (meth)acrylate, methoxytetraethylene glycol (meth)acrylate, methoxydipropylene glycol (meth)acrylate, methoxylated cyclodecatriene (meth)acrylate, morpholine (meth)acrylate, nonylphenoxypolyethylene glycol (meth) acrylate, nonylphenoxypolypropylene glycol (meth)acrylate, octafluoropentyl (meth)acrylate, phenoxyhydroxypropyl (meth)acrylate, phenoxyethyl (meth)acrylate, phenoxydiethylene glycol (meth)acrylate, phenoxytetraethylene glycol (meth)acrylate, phenoxyhexaethylene glycol (meth)acrylate, phenoxy (meth)acrylate, polypropylene glycol (meth)acrylate, sodium 2-sulfonate ethoxy (meth)acrylate, tetrafluoropropyl (meth)acrylate, tetrahydrofurfuryl (meth)acrylate, trifluoroethyl (meth)acrylate, hexafluoroisopropyl acrylate, vinyl acetate, N-vinyl caprolactam, N-vinylpyrrolidone, dicyclopentadienyl (meth)acrylate, and isobornyl (meth)acrylate (IBO(M)A). Preferred however are monomers with at least 2, more preferably at least 3 polymerizable functional groups such as (meth)acryloyl groups. Examples of poly-unsaturated compounds from this category are trimethylolpropane tri-(meth)acrylate (TMPT(M)A), 1,6-hexanediol di(meth)acrylate (HDD(M)A), glycerol tri-(meth)acrylate, pentaerythritol tri, tetra-(meth)acrylate, pentaerythritol tetra-(meth)acrylate, ditrimethylolpropane tetra-(meth)acrylate, di-pentaerythritol hexa-(meth)acrylate and their (poly) ethoxylated and/or (poly) propoxylated equivalents, as well as mixtures thereof. The acrylated forms hereof are preferred over methacrylated forms. Most preferred are di- and/or tri-acrylates. Preferably, monomers can also be biobased.

Particularly preferred are IBO(M)A, HDD(M)A, and TMPT(M)A. Compounds like IBO(M)A can be also partially biobased compounds thereby increasing the biobased content of the reacted product.

Reactive diluents e are preferably included in a proportion of 0.01 to 90 wt %, in particular from 0.5 to 75 wt %, in particular from 10 to 60 wt % of the composition.

In a third aspect, the present invention relates to a process for preparing a radiation curable and at least partially biobased urethane (meth)acrylate for use in a coating composition for cladding an outdoor surface of a building, comprising the step of reacting together at least the following compounds:
  a. A polyisocyanate having a biobased carbon content of at least 20%, preferably at least 50%, as determined by method A of the standard ASTM D6866-12: 2008, and
  b. A (meth)acrylate compound, different from compound a, and containing a reactive group capable to react with isocyanate groups.

The urethane (meth)acrylate may be as specified in any embodiment of the first aspect. Any feature of the third aspect may be as correspondingly described in the first aspect.

The reaction is preferably carried out at a temperature of from 30 to 90° C. Optionally, the reaction may be performed in the presence of a catalyst. Examples of suitable catalysts are cobalt naphthenate, zinc naphthenate, lead 2-ethylhexanoate, dibutyltin dilaurate, tin 2-ethylhexanoate, triethylamine, bismuth neodecanoate and 1,4-diazabicyclo[2.2.2] octane.

Optionally, the reaction may be performed in presence of a stabilizer.

Examples of suitable catalysts and stabilizers are known to the person skilled in the art, for example as described in *"Polyurethane Kunststoff-Handbuch 7"* by Becker, G. W.; Braun, D.; Oertel, G., 3. Edition, Carl Hanser Verlag, 1993.

The reaction can be performed in presence or in absence of a solvent. It is preferably performed in absence of a solvent.

In embodiments, said following compounds further comprise a polyol c different from compounds a and b. Polyol c is as defined in the first aspect of the present invention.

When the optional polyol c is used in the reaction, the process can be carried out, for instance, in one of the following ways:
  The polyisocyanate compound a, the (meth)acrylate compound b, and the polyol c may be reacted simultaneously; or
  The polyisocyanate compound a and the (meth)acrylate compound b may be first reacted together in such a way that there is an excess of isocyanate groups with respect to the groups capable to react with isocyanate groups, then, the obtained reaction product is reacted with the polyol c;
  The polyisocyanate compound a and the polyol c are first reacted together in such a way that there is an excess of isocyanate groups with respect to the groups capable to react with isocyanate groups, then, the obtained reaction product is reacted with the (meth)acrylate compound b.

In a fourth aspect, the present invention relates to a process for curing a urethane (meth)acrylate according to any embodiment of the first aspect or a composition according to any embodiment of the second aspect comprising exposing the urethane (meth)acrylate or the composition to one or more of an electron beam or an UV radiation.

In embodiments where UV radiation is used, a UV light source as indicated in the first aspect may be used.

Typically, the composition is provided on a substrate before curing. The substrate is typically an outdoor surface such as the outside wall of a building or a surface intended for covering the outside wall of a building. The substrate is preferably provided with a primer before the composition is applied thereon. The primer can for instance be a UV-curable polyurethane acrylate dispersion (UV-PUD). Preferably, the substrate or the primer on the substrate is sanded before the composition is applied thereon.

In the fifth aspect, the present invention relates to the use of an urethane (meth)acrylate according to any embodiment of the first aspect or of a composition according to any embodiment of the second aspect for covering an outdoor surface.

In embodiments, the use may be for forming a top coat on the outdoor surface. By top coat, it is meant a coating which is not later covered by a further coating.

In a sixth aspect, the present invention relates to a substrate coated with a urethane (meth)acrylate according to any embodiment of the first aspect or a composition according to any embodiment of the second aspect. A typical example of substrate is a substrate intended for covering the outside wall of a building or a substrate forming the outside wall of a building.

The present invention will now be described in detail with reference to the following non limiting examples which are by way of illustration only. Except when otherwise indicated, the parts mentioned in the examples are parts by weight.

EXAMPLE 1: PREPARATION OF A BIO URETHANE METHACRYLATE

A partially biobased-urethane methacrylate resin according to an embodiment of the first aspect of this invention was prepared using the following materials:

| Raw material | Quantity (in grams) |
| --- | --- |
| Desmodur ® eco N 7300 | 1000 |
| hydroxyethyl acrylate | 333.7 |
| Hydroxypropyl acrylate | 166.1 |
| Dibutyltin laurate | 0.8 |
| 2-ethyl-1,3-hexanediol | 69.7 |
| Hexanediol diacrylate | 386 |

Desmodur® eco N 7300 from Covestro Deutschland, Leverkusen, Germany

Hexanediol diacrylate from allnex, Frankfurt, Germany

The isocyanate (Desmodur® eco N 7300) together with the catalyst and extra stabilizer butylated hydroxy toluene was charged in a 3-liter glass reactor with reflux condenser with stirrer and thermometer and heated to 60° C. by means of an oil bath. The hydroxypropyl acrylate was then added slowly with a dosing pump while stirring.

During the addition of the hydroxypropyl acrylate, the temperature was kept at no more than 65° C. Once all of the hydroxypropyl acrylate was added, the temperature was raised to 65° C. and hydroxyethyl acrylate was added slowly again under stirring and the temperature was kept at 70° C. max. When all of the hydroxyethyl acrylate was added and the NCO content was stable (tested by reverse titration, using dibutylamine) the 2-ethyl-1,3-hexanediol was added and the temperature was kept at 80° C. until the end of the reaction.

EXAMPLE 2: PREPARATION OF A COATING COMPOSITION FROM THE URETHANE METHACRYLATE OF EXAMPLE 1

The product obtained in example 1 was diluted with HDDA (hexanediol diacrylate) and drummed off. The viscosity of the product was 160000 mPas at 23° C. It was further diluted with 12.5 gram of HDDA to bring the viscosity to 28600 mPas at 23° C.

The resulting resin was a clear liquid with a color of 41 APHA and containing less than 100 ppm of residual HEA and HPA.

This intermediate composition contained 80% urethane acrylate resin, which has a bio-carbon content of about 44%.

It was then formulated as a cladding as indicated in the table below:

| Cladding | pbw |
| --- | --- |
| Example 1 | 70 |
| HDDA | 30 |
| Irgacure 1173/TPO 8/2 | 4 |
| Tinuvin 292 | 2 |
| Tinuvin 400 | 1 |
| Additol XL 6526 | 1 |

EXAMPLE 3: COATING OF A FIBRE CEMENT PANEL WITH THE COMPOSITION OF EXAMPLE 2

A fibre cement panel was coated by wet spray with 120 g/m$^2$ of a UV-PUD primer. The composition of the primer is shown in the table below:

| UV-PUD primer | pbw |
| --- | --- |
| UCECOAT 7630 | 100 |
| pigment | 3 |
| BYK 346 | 0.5 |
| BYK 1770 | 0.3 |
| Irgacure 1173/TPO 8/2 | 1.5 |
| Additol VXW 6360 | x |
| Tafigel PU 64 1/1 water | x |

UCECOAT 7630 was obtained from allnex.

This primer was then dried at 60° C. and UV-cured at 6 m/min with a 80 W Ga+Hg UV source.

Once cured, the primer was sanded before applying the coating of example 2.

30 g/m$^2$ of the coating of example 2 was applied on the primer with a roller coater. It was then cured at 6 m/min with first a 80 W Ga+Hg light source followed by a 120 W Hg light source. This resulted in an about 30 µm thick clear finish.

EXAMPLE 4: EXPOSING OF THE COATING OF EXAMPLE 3 TO A XENON LIGHT

The coating of Example 3 has been subjected to xenon weathering testing (including water spray) according to EN ISO 16474-2, method A, cycle 1, for a total testing time of 4000 hours. After 500, 1000, 1500, 1887, 2504, 3505, and 4000 hours of xenon-testing had been completed, the coating has been optically analysed. Up to 3505 hours of testing, no visible defects could be observed. The coating was still intact. Only at 4000 hours of testing could some defects be observed, although not at the level of the coating but at the level of the interface between the primer and the substrate. In particular, delamination points between the fiber cement and the primer could be seen. This testifies of the excellent weathering resistance of the coating according this embodiment of the present invention.

EXAMPLE 5: EXPOSING THE COATING OF EXAMPLE 3 TO A QUV-B 313 TESTING WITH CONDENSATION AT 55° C.

The coating of Example 3 has been subjected for three months to exposure to a QUV-B 313 testing with condensation at 55° C. and no visible defects could be observed.

EXAMPLE 6: MEASUREMENT OF OPTICAL PROPERTIES AND STAIN RESISTANCE OF THE COATING COMPOSITION OF EXAMPLE 2 UPON UV CURE

A 24 µm wet film and a 60 µm wet film of the coating composition of Example 2 were formed on separate white Leneta papers, then UV cured at 6 m/min with a 80 W Ga UV source and a Hg UV source. No significant yellowing was observed by the end of the curing. For the coating resulting from the 24 µm wet film, the gloss at 60° and 85° were measured and stain tests were performed by exposing the coating 24 h to a staining to substance. The results are summarized in the table below:

| | | |
|---|---|---|
| Gloss | 60° | 94.1 |
| | 85° | 100.4 |
| 24 hours stain test | Mustard | 3 |
| | Coffee | 5 |
| | 2% Eosine/water | 2⁻ |
| | Methylene blue | 2 |
| | 1% Iodine/water | 2 |

The gloss values are good values for cladding.
The staining score range from 1 (worse) to 5 (best).

The invention claimed is:

1. A radiation curable and at least partially biobased urethane (meth)acrylate for use in a coating composition for cladding an outdoor surface of a building, obtained from the reaction of at least the following compounds:
   a. a polyisocyanate compound having a biobased carbon content of at least 20%, as determined by method A of the standard ASTM D6866-12:2008, wherein the polyisocyanate compound comprises an oligomer of a diisocyanate, and
   b. a (meth)acrylate compound, different from compound a, and containing a reactive group capable to react with isocyanate groups.

2. The urethane (meth)acrylate according to claim 1, wherein the coating composition is a one-component coating composition.

3. The urethane (meth)acrylate according to claim 1, wherein the compound a comprises at least 2 isocyanate groups.

4. The urethane (meth)acrylate according to claim 1, wherein the oligomer of the diisocyanate is a trimer.

5. The urethane (meth)acrylate according to claim 1, wherein the polyisocyanate compound is aliphatic.

6. The urethane (meth)acrylate according to claim 5, wherein the polyisocyanate compound is an oligomer of a $C_2$-$C_8$, aliphatic diisocyanate.

7. The urethane (meth)acrylate according to claim 1, wherein the polyisocyanate compound has an isocyanate content of at least 15 wt %.

8. The urethane (meth)acrylate according to claim 1, wherein said following compounds further comprise:
   c. a polyol, different from the compound a and the compound b.

9. A coating composition for cladding an outdoor surface of a building comprising the urethane (meth)acrylate according to claim 1.

10. A coating composition according to claim 9, which is a one-component coating composition.

11. The composition according to claim 9, further comprising a reactive diluent.

12. The composition according to claim 9, further comprising a UV absorber and/or a hindered amine light stabilizer.

13. The composition according to claim 9, further comprising a one or more additives selected from the group consisting of rheology modifiers, photoinitiators, inhibitors, light absorbers, wetting agents, plasticizers, non-reactive diluents, and flexibilizers.

14. A process for preparing a radiation curable and at least partially biobased urethane (meth)acrylate for use in a coating for cladding an outdoor surface of a building, comprising the step of reacting together at least the following compounds:
   a. a polyisocyanate having a biobased carbon content of at least 20%, preferably at least 50%, as determined by method A of the standard ASTM D6866-12:2008, wherein the polyisocyanate compound comprises an oligomer of a diisocyanate, and
   b. a (meth)acrylate compound, different from compound a, and containing a reactive group capable to react with isocyanate groups.

15. A process for curing a urethane (meth)acrylate according to claim 1 comprising exposing the urethane (meth)acrylate to one or more of an electron beam or an UV radiation.

16. Substrate coated with a urethane (meth)acrylate according to claim 1.

17. The urethane (meth)acrylate according to claim 1, wherein the polyisocyanate compound has a biobased carbon content of at least 50% as determined by method A of the standard ASTM D6866-12:2008.

18. The urethane (meth)acrylate according to claim 1, wherein the polyisocyanate compound comprises an allophanate (R—NH—CO—NR—CO—O—R), a biuret (R—NH—CO—NR—CO—N—R), or an isocyanurate group of the following formula:

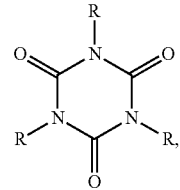

wherein R is an aliphatic chain having from 2 to 8 carbon atoms comprising an isocyanate group, usually in a terminal position.

19. The urethane (meth)acrylate according to claim 3, wherein the compound a comprises from 2 to 5 isocyanate groups.

20. The urethane (meth)acrylate according to claim 3, wherein the compound a comprises from 3 to 5 isocyanate groups.

21. The urethane (meth)acrylate according to claim 3, wherein the compound a comprises from 3.5 to 4.5 isocyanate groups.

22. The urethane (meth)acrylate according to claim 6, wherein the polyisocyanate compound is an oligomer of a $C_5$-$C_6$ aliphatic diisocyanate.

* * * * *